Patented Apr. 25, 1933

1,905,294

UNITED STATES PATENT OFFICE

GEORG KALISCHER, OF FRANKFORT-ON-THE-MAIN, AND RICHARD FLEISCHHAUER, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

AZO DYESTUFFS AND PROCESS OF MAKING SAME

No Drawing. Application filed July 10, 1930, Serial No. 467,123, and in Germany August 3, 1929.

The present invention relates to new azo-dyestuffs and to a process of making same, more particularly to dyestuffs corresponding to the general formula:

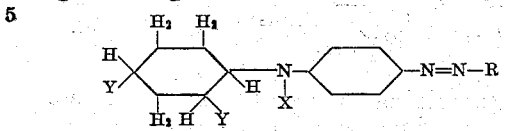

(wherein X means hydrogen or an acyl-group which may contain an azo-group, R stands for a combining component containing sulfonic or carboxylic groups and the Y's mean hydrogen or one Y hydrogen and the other methyl).

The process of manufacture in accordance with this invention comprises diazotizing a 1-(N-acyl-cyclohexyl-amino)-4- amino - benzene corresponding to the general formula:

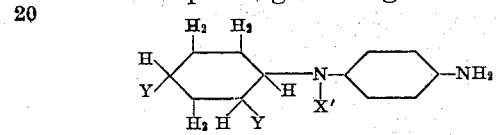

(wherein X' means an acyl-group which may contain an amino-group capable of being diazotized and the Y's have the aforesaid signification) and combining the diazo-compounds thus obtained with azo components containing sulfonic or carboxylic groups.

The N-acyl-cyclohexyl-amino-arylamines are, for example, obtainable by condensing cyclo-hexyl-amine or its substitution products with nitro-derivatives of the aromatic series containing a labile halogen atom, hydrohalic acid being split off, by acylating the nitro-derivatives thus obtained and by reducing the products thus formed (see U. S. applications Ser. Nos. 399,087, filed October 11, 1929, and 411,977, filed December 12, 1929).

It is the cyclohexyl residue contained in the molecule of the new azo-dyestuffs, which determines their character. Compared with the dyestuffs obtained by using analogous diazo-compounds containing an alkyl-group instead of the cyclohexyl-residue the present new dyestuffs are distinguished not only by a clear more yellowish shade, but also by an increased affinity to the animal fiber and a better fastness to washing and fulling. In many cases also the fastness to light is better.

The new mono-azo-dyestuffs may be after-chromed on the fiber, when chromable groups are present in their molecule.

By using the diazo-compounds of such N-acyl-cyclohexyl-amino-arylamines which contain a further diazotizable amino-group in the acyl residue such as N-(m-aminobenzoyl-cyclo-hexyl)-p-phenylene-diamine and combining them with two molecular proportions of the same or different azo components, disazo-dyestuffs of analogous properties are obtained.

The dyestuffs being the object of this invention may be converted into new valuable dyestuffs by splitting off the acyl residue by treatment with saponifying agents. These new dyestuffs are distinguished by their more bluish shades but otherwise correspond in properties with the dyestuffs containing the acyl residue.

In order to further illustrate our invention the following examples are given, the parts being by weight and all temperatures in centigrade degrees; but we wish it however to be understood that we are not limited to the particular products nor reaction conditions mentioned therein.

*Example 1*

To a solution of 23.2 parts of 1-(N-acetyl-cyclohexyl-amino)-4-amino-benzene in about 100 parts of water and 35 parts of hydrochloric acid (d=1.16) a concentrated aqueous solution of 6.9 parts of sodium nitrite is added while cooling with ice. After a short time the diazotation is finished. The diazo-solution is allowed to run into a solution of 25 parts of the sodium salt of 2.6-naphthol-sulfonic acid containing an excess of carbonate of soda. When the formation of the dyestuff is finished the dyestuff is isolated by the addition of common salt, filtered and dried. It corresponds to the formula:

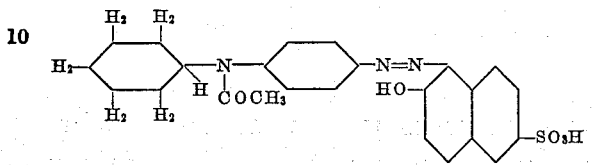

The new dyestuff thus obtained is an orange-red powder, easily soluble in water, dyeing wool fast orange shades.

By employing instead of 2.6-naphthol-sulfonic acid the corresponding amount of 2-naphthol-6.8-disulfonic acid a dyestuff is obtained which dyes wool bright orange shades, fast to light and of a good leveling power.

Similar dyestuffs are obtained by replacing the 1-(N-acetyl-cyclohexyl-amino)-4-amino-benzene by the corresponding amount of 1-(N-benzoyl-cyclohexyl-amino)-4-amino-benzene or its substitution products.

*Example 2*

23.2 parts of 1-(N-acetyl-cyclohexyl-amino)-4-amino-benzene are diazotized as described in Example 1. The diazo-solution is allowed to run into a solution of 52 parts of 1-(benzoyl-amino)-8-naphthol-4.6-disulfonic acid containing an excess of sodium carbonate. The isolated and dried dyestuff corresponds to the following formula:

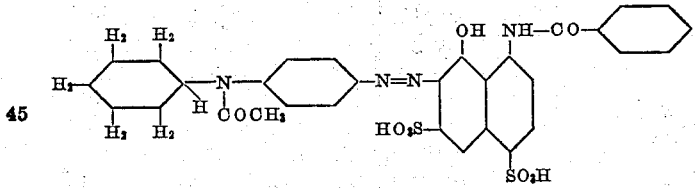

It is a red powder, easily soluble in water, dyeing the animal fiber clear red shades of excellent fastness to washing, fulling and a good fastness to light.

Similar dyestuffs are obtained by employing as diazo components 1-N-acetyl-(p-methyl-cyclohexyl)-amino-4-amino-benzene or 1-N-acetyl-(o-methyl-cyclohexyl)-amino-4-amino-benzene.

Also other amino-naphthol-sulphonic acids may be used as combining components. By employing, for example, 1-(tetrahydronaphthalene-2'-sulfo-amino)-8-naphthol-3.6-disulphonic acid a dyestuff is obtained dyeing wool very clear bluish red shades of a good fastness to fulling and light.

*Example 3*

29.4 parts of 1-(N-benzoyl-cyclohexyl-amino)-4-amino-benzene are diazotized as described in Example 1. 37 parts of a neutral solution of the sodium salt of 2-(o-methoxy-phenyl-amino)-8-naphthol-6-sulfonic acid are allowed to run into the diazo-solution to which an excess of sodium acetate has been added. When the combination is complete the separated dyestuff is filtered and dried. It represents a dark powder, easily soluble in water, dyeing wool from an acid bath clear dark reddish brown shades of excellent fastness properties.

By carrying out the formation of the dyestuff in the presence of sodium carbonate a dyestuff is obtained, which dyes wool more yellowish brown shades of likewise excellent fastness properties. It corresponds to the formula:

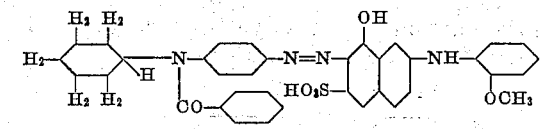

By combining in the presence of mineral acid a product is obtained, dyeing wool claret-brown shades of a good fastness to fulling and to light.

Instead of 2-(o-methoxy-phenylamino)-8-naphthol-6-sulfonic acid other amino-naphthol-sulfonic acids or aryl-amino-naphthol-sulfonic acids may be employed. Likewise instead of the said diazo-solution the diazo-solutions of the substitution products of 1-(N-benzoyl-cyclohexyl-amino)-4-amino-benzene or 1-(N-acetyl-cyclohexyl-amino)-4-amino-benzene may be used.

*Example 4*

36.3 parts of 1-N-(2'.5'-dichloro-benzoyl)-cyclohexyl-amino-4-amino-benzene are diazotized. The obtained diazo-solution is allowed to run into 25 parts of the solution of the sodium salt of 2.8-naphthol-sulfonic acid with the addition of sodium carbonate. The separated dyestuff is filtered and dried. It corresponds to the formula:

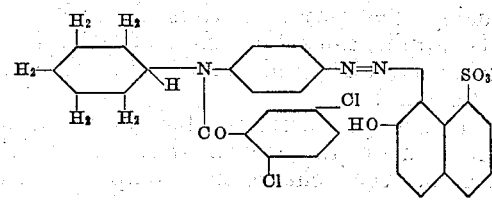

It represents an orange powder, dyeing the animal fiber very bright yellowish orange shades of a good fastness to washing and fulling.

By combining the said diazo-solution with pyrazolone-sulfonic- or -carboxylic acids, for example with 1-(2'-chloro-5'-sulfophenyl)-3-methyl-5-pyrazolone, clear yellow azo-dyestuffs are obtained of a good fastness to light and fulling.

*Example 5*

14.9 parts of 1-(N-amino-benzoyl)-cyclohexyl-amino-4-amino-benzene are dissolved with about 80 parts of water and 35 parts of hydrochloric acid (d=1.16) while stirring at room temperature and diazotized by the addition of a concentrated, aqueous solution of 6.9 parts of sodium nitrite while cooling with ice. The obtained tetrazo-solution is allowed to run into a solution of 25 parts of 2-naphthol-8-sulfonic acid with the addition of an excess of sodium carbonate. The isolated dyestuff represents when dry an orange powder, easily soluble in water, which dyes wool bright orange shades of a good fastness to fulling. It corresponds to the formula:

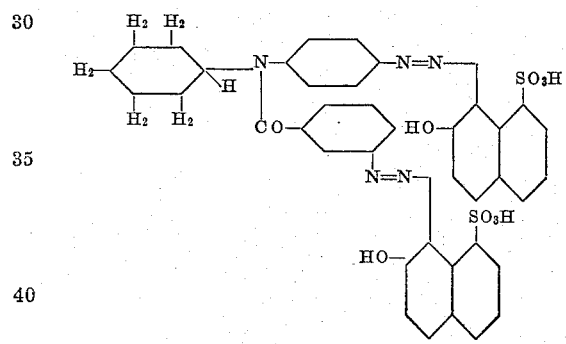

*Example 6*

23.2 parts of 1-(N-acetyl-cyclohexyl-amino)-4-amino-benzene are diazotized as described in Example 1. The diazo-solution is allowed to run into a caustic alkali solution of 14 parts of salicylic acid. When the formation of the dyestuff is finished, the dyestuff may be isolated by salting it out. It corresponds to the formula:

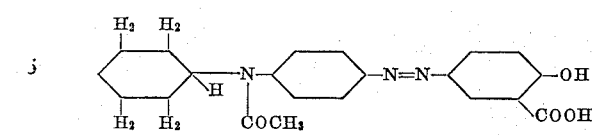

and represents when dry a yellowish powder, dyeing wool reddish yellow shades, which become darker and fast to fulling by afterchroming.

Instead of salicyclic acid also other azo-components containing chromable groups may be employed.

*Example 7*

23.2 parts of 1-(N-acetyl-cyclohexyl-amino)-4-amino-benzene are diazotized as described in Example 1. The obtained diazo-solution is allowed to run into a solution of 33 parts of 1.8-dihydroxy-naphthalene-3.6-disulfonic acid containing an excess of sodium acetate. When the combining is complete such an amount of sulfuric acid is added to the solution of the dyestuff that a 15% acid is formed and the whole is boiled in an apparatus provided with a reflux condenser, until a test, when mixed with sodium acetate, shows a pure greenish blue color. The dyestuff is filtered when cool and may be purified, if necessary, by dissolving it with sodium acetate and after-treatment with common salt. It corresponds to the formula:

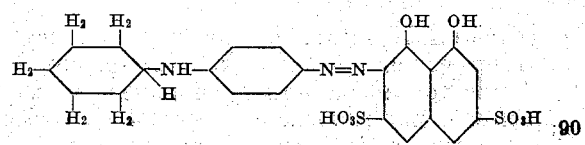

It dyes wool clear greenish blue shades, whereas the original dyestuff dyes wool red shades.

The same blue dyestuff may be obtained by combining diazotized 1 - (N - (p - toluene-sulfo)-cyclohexyl - amino)-4 - aminobenzene with 1.8-dihydroxy-naphthalene-3.6-disulfonic acid and following saponification of this dyestuff.

We claim:—

1. Process which comprises diazotizing a 1-(N-acyl-cyclohexyl - amino)-4 - amino benzene corresponding to the general formula:

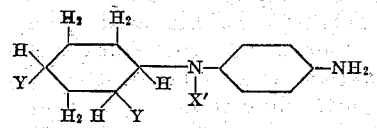

(wherein X' means an acyl-group which may contain an amino-group capable of being diazotized and the Y's mean hydrogen or one Y hydrogen and the other methyl) and combining the diazo-compounds thus obtained with azo components of the benzene, naphthalene or pyrazolone series containing sulfonic or carboxylic groups.

2. Process which comprises diazotizing a 1(N-acyl-cyclohexyl-amino) - 4 - amino-benzene of the general formula:

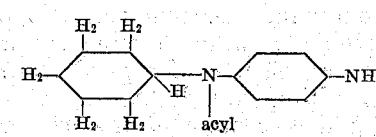

and combining the diazo compound thus formed with a hydroxy-naphthalene-sulfonic acid which may contain a further sulfonic acid group or in addition thereto a further substituent selected from the group consisting of hydroxy, amino, acylamino and arylamino of the benzene series.

3. Process which comprises diazotizing 1-(N-acetyl-cyclohexyl-amino)-4-amino-benzene of the formula:

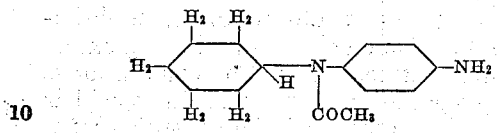

and combining the diazo compound thus formed with 1-benzoyl-amino-8-hydroxy-naphthalene-4.6-disulfonic acid.

4. As new compounds the azo-dyestuffs of the general formula:

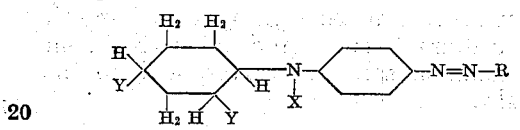

(wherein X means hydrogen or an acyl-group which may contain a azo-group, R stands for a combining component of the benzene, naphthalene or pyrazolone series containing sulfonic or carboxylic groups and the Y's means hydrogen or one Y hydrogen and the other methyl) which compounds are colored powders soluble in water, yielding on animal fibers from an acid bath fast dyeings.

5. As new compounds the azo-dyestuffs of the formula:

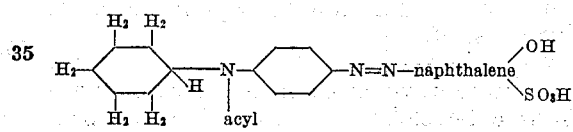

(wherein the naphthalene nucleus may contain a further sulfonic acid group or in addition thereto a further substituent selected from the group consisting of hydroxy, amino, acylamino and arylamino of the benzene series, which compounds are colored powders soluble in water, yielding on animal fibers from an acid bath fast dyeings.

6. As a new compound the azo-dyestuff of the formula:

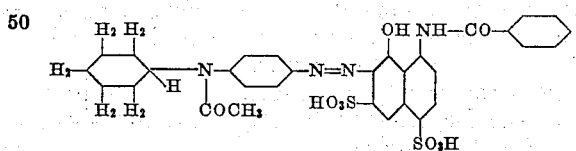

which compound represents a red powder, easily soluble in water, dyeing the animal fiber clear red shades of a good fastness to washing, milling and light.

7. As a new compound the azo-dyestuff of the formula:

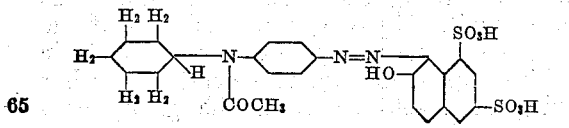

which compound represents an orange powder, easily soluble in water, dyeing animal fibers bright orange shades fast to light and of a good leveling power.

In testimony whereof, we affix our signatures.

GEORG KALISCHER.
RICHARD FLEISCHHAUER.